United States Patent
Ziegler et al.

(10) Patent No.: US 7,970,195 B2
(45) Date of Patent: Jun. 28, 2011

(54) METHOD AND DEVICE FOR THE ITERATIVE RECONSTRUCTION OF TOMOGRAPHIC IMAGES

(75) Inventors: Andy Ziegler, Hamburg (DE); Thomas Koehler, Norderstedt (DE); Roland Proksa, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 819 days.

(21) Appl. No.: 11/908,294

(22) PCT Filed: Mar. 7, 2006

(86) PCT No.: PCT/IB2006/050699
§ 371 (c)(1),
(2), (4) Date: Sep. 11, 2007

(87) PCT Pub. No.: WO2006/097867
PCT Pub. Date: Sep. 21, 2006

(65) Prior Publication Data
US 2008/0205729 A1    Aug. 28, 2008

(30) Foreign Application Priority Data
Mar. 16, 2005    (EP) .................................... 05102057

(51) Int. Cl.
    *G06K 9/00*    (2006.01)
(52) U.S. Cl. .......................................... 382/131; 378/21
(58) Field of Classification Search ................... 382/131
    See application file for complete search history.

(56) References Cited

U.S. PATENT DOCUMENTS

| | | | | |
|---|---|---|---|---|
| 6,310,968 B1 * | 10/2001 | Hawkins et al. | .............. | 382/131 |
| 6,339,652 B1 * | 1/2002 | Hawkins et al. | .............. | 382/131 |
| 7,085,405 B1 * | 8/2006 | Levkovitz et al. | ............ | 382/131 |
| 7,356,113 B2 * | 4/2008 | Wu et al. | .......................... | 378/27 |
| 2007/0183642 A1 * | 8/2007 | Ye et al. | ......................... | 382/131 |
| 2008/0205729 A1 * | 8/2008 | Ziegler et al. | ................. | 382/131 |

FOREIGN PATENT DOCUMENTS

| | | |
|---|---|---|
| WO | 2004100070 A1 | 11/2004 |
| WO | 2006097867 A2 | 9/2006 |

OTHER PUBLICATIONS

Andersen, A. H.; Algebraic Reconstruction in CT from Limited Views; 1989; IEEE Trans. on Medical Imaging; 8(1) 50-55.
Censor, Y.; Row-action methods for huge and sparse systems and their applications; 1981; SIAM Review; 23(4) 444-466.
Feldkamp, L. A. et al.; Practial cone-beam algorithm; 1984; J. Opt. Soc. Am.; 1(6)612-619.
Gordon, R., et al.; Algebraic Reconstruction Techniques (ART) for Three-dimensional Electron Microscopy and X-ray Photography; 1970; J. Theor. Biol.; 29:471-481.
Koehler, T., et al., SNR-Weighted ART applied to transmission tomography; 2004; IEEE; pp. 2739-2742.
Lange, K., et al.; Globally Convergent Algorithms for Maximum a posteriori Transmission Tomography; 1995; IEEE Trans. on Image Processing; 4(10)1430-1450.

* cited by examiner

*Primary Examiner* — Sath V Perungavoor

(57) ABSTRACT

The invention relates to a device and a method for the iterative reconstruction of the attenuation coefficients $\mu_j$ in a tomographic image of an object (1) from projection measurements $m_i$. In the update equation for $\mu_j^n$ during the n-th iteration the backprojected error $(m_i - m_i - (\mu_j^n))$ is weighted by a voxel dependent factor Formula (I). Such a voxel dependent update may particularly be included in the algorithms of ART or ML.

10 Claims, 5 Drawing Sheets

METHOD AND DEVICE FOR THE ITERATIVE RECONSTRUCTION OF TOMOGRAPHIC IMAGES

The invention relates to a data processing unit, an examination apparatus, a record carrier, and a method for the iterative reconstruction of tomographic images from projection measurements.

Cross sectional or tomographic images of an object can be reconstructed if a sufficient large number of projections through the object from different directions are available, wherein each projection represents the line integral of attenuation coefficients along a projection ray. A lot of reconstruction algorithms have been developed and described in literature, for example reconstruction algorithms of Filtered Backprojection FBP type (e.g. L. A. Feldkamp, L. Davis, and J. Kress: "Practical Cone-beam Algorithm", Journal of Optical Society of America, 1:612-619, 1984), Algebraic Reconstruction Technique ART (R. Gordon, R. Bender, and G. T. Herman: "Algebraic reconstruction techniques (ART) for three-dimensional electron microscopy and x-ray photography", J. Theor. Biol., 29:471-481, 1970), Maximum Likelihood (ML) methods (K. Lange and J. A. Fessler: "Globally convergent algorithms for maximum a posteriori transmission tomography", IEEE Transactions on Image Processing, 4(10):1430-1450, 1995), or the "Ordered Subsets" variants thereof. Each of these algorithms has its particular strengths and problems. Thus images reconstructed with Ordered Subsets Maximum Likelihood (OSML) have a better signal-to-noise ratio than achieved by the reconstruction with FBP or ART, but the reconstruction with OSML needs more time than with ART and much more time than with FBP.

Based on this situation it was an object of the present invention to provide means for an improved iterative reconstruction of tomographic images, in particular means that offer the opportunity of an implementation on a fast accelerator board.

This object is achieved by a data processing unit according to claim 1, an examination apparatus according to claim 8, a method according to claim 9, and a record carrier according to claim 10. Preferred embodiments are disclosed in the dependent claims.

According to its first aspect, the invention relates to a data processing unit, for example a conventional (general-purpose) computer system with a central processing unit, memory, I/O interfaces and the like together with appropriate software. The data processing unit shall be able to reconstruct iteratively the attenuation coefficients $\mu_j$ (j=1, ... N) of a tomographic image of an object (for example the body of a patient) from projection measurements $m_i$ (i=1, ... P) generated from different directions through the object. The projection measurements may for example be produced by X-radiation in a CT scanner. Each projection measurement $m_i$ corresponds to one pixel and a certain projection perspective. The measurements $m_i$ are related to the attenuation coefficients $\mu_j$ according to the following equations:

$$m_i = R(p_i) \text{ and} \tag{1}$$

$$P_i = [A\underline{\mu}]_i = \sum_v A_{iv}\mu_v, \tag{2}$$

wherein R is a given "measurement function" and $A=[A_{ij}]$ is a given weighting matrix (note that [ ... ] denotes the matrix, $A_{ij}$ denotes the element of row i and column j of this matrix, and that the range of the indices i, j is always defined as above, i.e. $1 \leq i \leq P$ and $1 \leq j \leq N$). These and the following equations will be explained in more detail below with reference to the Figures.

The data processing unit is adapted to determine during the n-th iteration step the update $\mu_j^{n+1}$ (n=1, ... ) of the attenuation coefficient $\mu_j^n$ according to the following equation:

$$\mu_j^{n+1} = \mu_j^n + \lambda \sum_{i \in I_n} V\left(\frac{A_{ij}\mu_j^n}{p_i^n}\right) \cdot W_i(A, p_i^n) \cdot A_{ij}\delta_i^n, \tag{3}$$

wherein the variables have the following meaning:
$\lambda$ is a relaxation parameter;
$I_n \subseteq \{1, \ldots P\}$ is an index set that may for example be chosen according to the principles of an "Order Subsets" method;
V is a monotonous function of its argument and may particularly be the identity;

$$p_i^n = \sum_v A_{iv}\mu_v^n$$

is the current estimation for the i-th projection;
$W_i$ is a given weighting function that is typically determined by the underlying reconstruction model (for example ART or OSML); and
$\delta_i^n = m_i - m_i^n = m_i - R(p_i^n)$ is the current error of the forward projection.

The data processing unit described above implements the basic steps of many known iterative reconstruction algorithms, namely
1. the calculation of forward projections $p_i^n$ based on the current estimation or model of the attenuation coefficients $\mu_j^n$;
2. the calculation of the residual errors $\delta_i^n$ between the calculated and the measured projections; and
3. the backprojection or distribution of the calculated errors $\delta_i^n$ across the attenuation coefficients $\mu_j^n$.

The aforementioned distribution of errors $\delta_i^n$ in equation (3) comprises known components like a weighting function $W_i$, a relaxation parameter $\lambda$, and a sum over an (ordered) subset $I_n$. A crucial feature of equation (3) is, however, that it also comprises a voxel dependent factor $V(A_{ij}\mu_j^n/p_i^n)$. This factor guarantees that the update experienced by each voxel in each iteration step is dependent on the contribution said voxel made to corresponding forward projection. As simulations show, such a voxel dependent update improves the signal-to-noise ratio and speed of conventional algorithms.

The measurement function R may particularly be the identity. In this case, the projection measurements $m_i$ correspond to the values $p_i$ which are typically used in algorithms based on ART.

The general formulation of equation (3) includes the case that the index set $I_n$ comprises all projections, i.e. $I_n=\{1, \ldots P\}$. Genuine subsets $I_n \subset \{1, \ldots P\}$ are particularly chosen in Order Subsets approaches to accelerate the speed of convergence. Moreover, the index set $I_n$ may optionally contain only one element $i_n \in \{1, \ldots P\}$. Such a choice of one (arbitrary) projection $i_n$ for the n-th iteration step is typical for ART.

A further correspondence of equation (3) to ART is achieved if the weighting function $W_i$ is particularly chosen as $$W_i(A, p_i^n) = \frac{1}{\sum_v A_{iv}^2}. \quad (4)$$

An alternative definition of the measurement function R is given by $$R(p_i) = \exp(-p_i). \quad (5)$$

The aforementioned definition of R is particularly suited for Maximum Likelihood approaches, wherein the number $Y_i$ of photons reaching a detector pixel in a certain projection geometry and time is measured. Moreover, the corresponding number $d_i$ of photons leaving the radiation source (i.e. before entering the object) is typically assumed to be known. In this case, the projection measurements $m_i$ can be defined by the quotient of the photon number $Y_i$ behind the attenuation object and the photon number $d_i$ before the attenuation object according to $$m_i = \frac{Y_i}{d_i}. \quad (6)$$

Note that $Y_i$ can be calculated as $$Y_i = d_i \cdot \exp\left(-\sum_v A_{iv}\mu_v\right),$$

which corresponds to $Y_i = d_i \cdot R(p_i)$ if equation (5) holds.

A further correspondence of equation (3) with ML approaches is achieved if the weighting function $W_i$ is chosen to be $$W_i(A, p_i^n) = \exp(p_i^n) \quad (7)$$

A comparison to the "genuine" ML equations shows that equation (3) requires less summations and is therefore computationally less expensive.

The invention relates also to an examination apparatus for the generation of tomographic images of an object, said apparatus comprising an imaging device for the generation of projection measurements of the object which is coupled to a data processing unit of the kind described above. The imaging device may particularly be a (rotational) X-ray device, e.g. a CT-scanner or a C-arm system.

The invention further relates to a method for the iterative reconstruction of the attenuation coefficients $\mu_j$ (j=1, ... N) of a tomographic image from projection measurements $m_i$ (i=1, ... P) obeying equations (1) and (2), wherein the update $\mu_j^{n+1}$ (n=1, ... ) of the attenuation coefficient $\mu_j^n$ is determined according to equation (3). Further developments of said method may comprise one or more of the steps that were described in connection with preferred embodiments of the data processing unit. For more information on details, advantages and variants of the method reference is therefore made to the description of the data processing unit.

Finally, the invention comprises a record carrier, for example a floppy disk, a hard disk, or a compact disc (CD), on which a computer program for the iterative reconstruction of the attenuation coefficients of a tomographic image from projection measurements is stored, wherein said program is adapted to execute a method of the aforementioned kind.

These and other aspects of the invention will be apparent from and elucidated with reference to the embodiment(s) described hereinafter.

In the following the invention is described by way of example with the help of the accompanying drawings in which.

Figure 1:
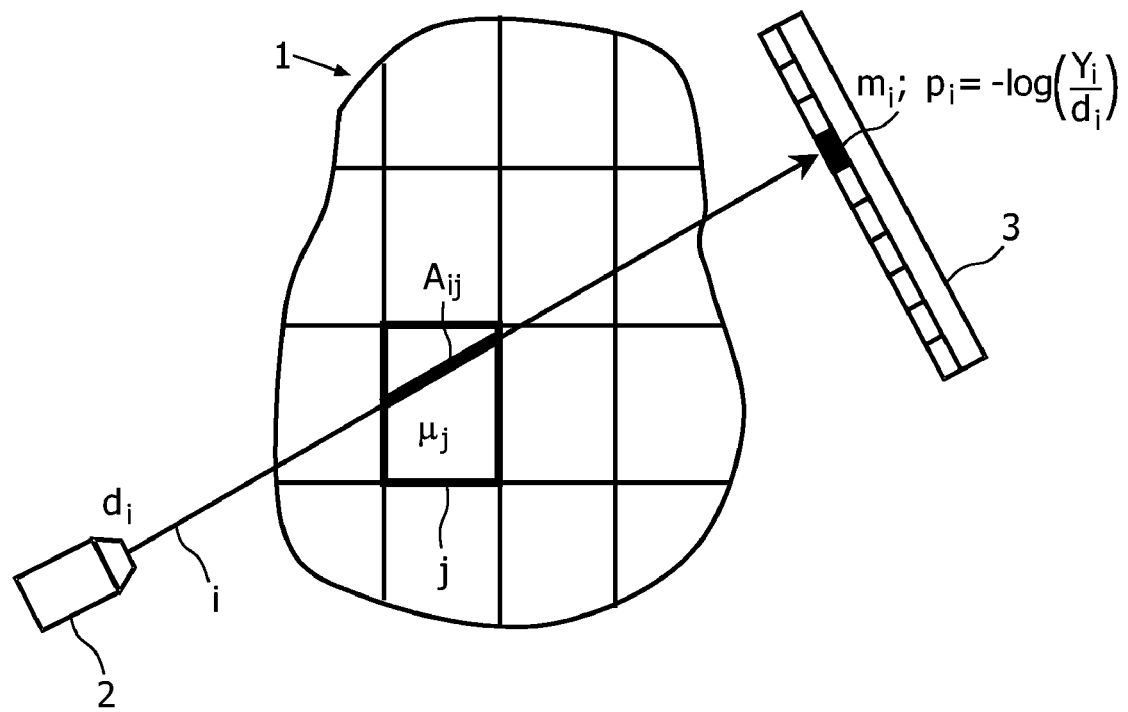
FIG. 1 illustrates the general setup of the iterative reconstruction problem.

In FIG. 1, the tomographic reconstruction problem is schematically illustrated and the variables used in the following are introduced. The objective of tomographic image reconstruction is to determine the (two- or three-dimensional) spatial distribution of attenuation coefficients $\mu$ in an object 1, for example in a slice through the body of a patient. In the usual discrete formulation of the problem, the image is divided into a number N of voxels with index $j \in \{1, \ldots N\}$, wherein each voxel j has a corresponding value $\mu_j$ of the attenuation coefficient.

From a radiation source 2, for example an X-ray tube, rays i are directed through the object 1. Photons of these rays that are not absorbed in the object 1 reach a detector 3 behind the object 1. The detector 3 typically comprises a large number of detector elements or pixels, each of them providing a projection measurement $m_i$. In Maximum Likelihood (ML) approaches, the number $Y_i$ of photons reaching a pixel during the exposure time is typically measured, and the corresponding number $d_i$ of photons leaving the radiation source 2 is assumed to be known. In approaches like Algebraic Reconstruction Technique (ART), the logarithmic projection value $$P_i = -\log\left(\frac{Y_i}{d_i}\right)$$

is typically considered as measurement. Both approaches can be described in a common framework by a measurement variable $m_i$, wherein $m_i = \exp(-p_i)$ for ML approaches and $m_i = p_i$ for ART approaches. In general, $m_i = R(p_i)$ with a given function R.

While only one projection geometry and one projection ray i are shown in FIG. 1, it goes without saying that the radiation source 2 and/or the detector 3 are moved (e.g. commonly rotated) to generate different projection directions, and that a plurality of pixels are measured for each of their configurations. The measured data $m_i$ for all geometries and pixels are then linearly indexed by the index $i \in \{1, \ldots P\}$.

The attenuation coefficients $\mu_j$, which are looked for, are represented in the measurements $m_i$ only as line integrals (or sums) through the object 1, wherein the contribution of each voxel j (i.e. of $\mu_j$) to a measurement $m_i = R(p_i)$ is given by a weighting factor $A_{ij}$ according to $$p_i = \sum_v A_{iv}\mu_v.$$

The matrix $A=[A_{ij}]$ can be calculated in advance according to the particular model of the measurement and the geometry (cf. literature on ART or ML).

In the following, a short review of standard ART and ML algorithms is given first. For $m_i = p_i$, the measured projection vector $\underline{p} = [p_i]$ can be expressed by the matrix product $$\underline{p} = A\underline{\mu}$$

One iterative step ($n \to n+1$) in standard ART (cf. R. Gordon et al., above; Y. Censor: "Row-action methods for huge and sparse systems and their applications", SIAM Review, 4(23): 444-466, 1981), which solves the linear system of equations, is given for the j-th absorption coefficient $\mu_j$ and the i-th projection $p_i$ by $$\mu_j^{n+1} = \mu_j^n + \lambda \frac{p_i - \sum_v A_{iv}\mu_v^n}{\sum_v A_{iv}^2} A_{ij} = \mu_j^n + \lambda \frac{A_{ij}\delta_i^n}{\sum_v A_{iv}^2}$$

where $\lambda$ is the so-called relaxation parameter which is used to control the convergence speed and $$\delta_i^n = \left( p_i - \sum_v A_{iv}\mu_v^n \right) = (p_i - p_i^n)$$

is the current error (difference between measurement and forward projection).

The Maximum Likelihood (ML) approach, on the contrary, takes into account the Poisson statistics of the photons which are measured. Since the various projections i are independent, the log-likelihood of the observed photon counts $Y_i$ can be written as (cf. K. Lange et al., above)

$$L(\mu) = \sum_i \left( -d_i e^{-\sum_v A_{iv}\mu_v} - Y_i \cdot \sum_v A_{iv}\mu_v \right) + c_1$$

where $d_i$ is the expected number of photons leaving the source along the i-th projection, $A_{ij}$ are basis volume elements (with $$\sum_v A_{iv} = 1$$

), and $c_1$ is irrelevant constant. For $\mu_j^n > 0$, the likelihood is increased by an iterative step ($n \to n+1$) of $$\mu_j^{n+1} = \mu_j^n + \mu_j^n \frac{\sum_i A_{ij}\left[ d_i \exp\left(-\sum_v A_{iv}\mu_v^n\right) - Y_i \right]}{\sum_i A_{ij}\left(\sum_v A_{iv}\mu_v^n\right) \cdot d_i \exp\left(-\sum_v A_{iv}\mu_v^n\right)}$$

One update of the convex ML algorithm requires the sum over all projections i, which costs much computation time and ends in a slow, but proven convergence of the reconstructed image. This requirement of using all projections simultaneously can be relaxed by using only a subset $I_n$ of all projections simultaneously. With the selection of ordered subsets, the ML method becomes an Ordered Subsets Maximum Likelihood (OSML) method, which can be written down as $$\mu_j^{n+1} = \mu_j^n + \lambda \mu_j^n \frac{\sum_{i \in I_n} A_{ij}\left[ d_i \exp\left(-\sum_v A_{iv}\mu_v^n\right) - Y_i \right]}{\sum_{i \in I_n} A_{ij}\left(\sum_v A_{iv}\mu_v^n\right) \cdot d_i \exp\left(-\sum_v A_{iv}\mu_v^n\right)}$$

where a global relaxation parameter $\lambda$ is included to control the speed of convergence.

The usual algorithms like ART, ML or OSML described above have the following general structure for the n-th iteration ($n \to n+1$):
1. Calculate the forward projection $m_i^n$ through the image as given by the current estimation $\mu^n$ of the attenuation coefficients (e.g. calculate the line integral $p_i^n$ or the relative number of photons $Y_i^n/d_i$).
2. Calculate the differences $\delta_i^n$ between forward projection $m_i^n$ and measurement $m_i$ and weight the differences as given by the model (e.g. ML or ART).
3. Project these weighted differences back on the image as given by the model.

According to the present invention, a simple voxel-dependent update in step 3 is proposed that can easily be implemented on a dedicated hardware. During such an update, the differences $\delta_i^n$, which are backprojected, are distributed inhomogeneously in such a way, that the contribution of each voxel to the forward projection sets the weight for the following update. Using this idea, e.g. ART can be transformed to an Enhanced ART (EART) with the update step defined by $$\mu_j^{n+1} = \mu_j^n + \lambda \cdot \left( \frac{A_{ij}\mu_j^n}{\sum_v A_{iv}\mu_v^n} \right) \cdot \frac{p_i - \sum_v A_{iv}\mu_v^n}{\sum_v A_{iv}^2} A_{ij} = \mu_j^n + \lambda \cdot \left( \frac{A_{ij}\mu_j^n}{\sum_v A_{iv}\mu_v^n} \right) \cdot \frac{A_{ij}\delta_i^n}{\sum_v A_{iv}^2},$$

where $$\left( \frac{A_{ij}\mu_j^n}{\sum_v A_{iv}\mu_v^n} \right)$$

is the additional term which sets the relative contribution of each voxel to the back-projection and differs from normal ART.

Also for OSML an enhanced version called OSEML can be created by requiring an update equation $$\mu_j^{n+1} = \mu_j^n + \lambda \cdot \mu_j^n \sum_{i \in I_n} A_{ij} \frac{\exp\left(-\sum_v A_{iv}\mu_v^n\right) - \exp(-p_i)}{\left(\sum_v A_{iv}\mu_v^n\right) \cdot \exp\left(-\sum_v A_{iv}\mu_v^n\right)}$$

with $\exp(-p_i) = Y_i/d_i$.

Figure 2:
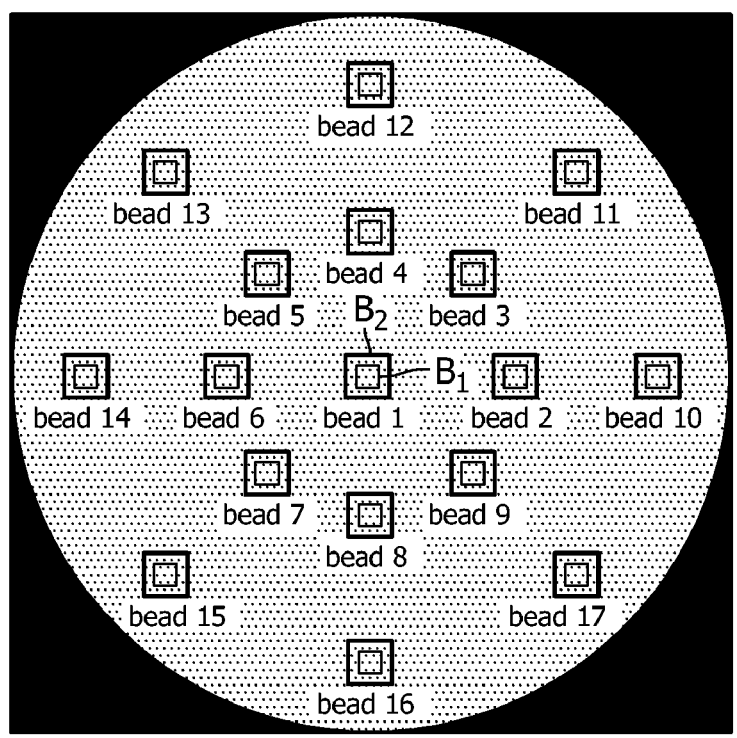
FIG. 2 represents the tomographic image of a water phantom with 17 steel beads that was used for simulation experiments, some results of which are shown in FIGS. 3 and 4.
Figure 3A:
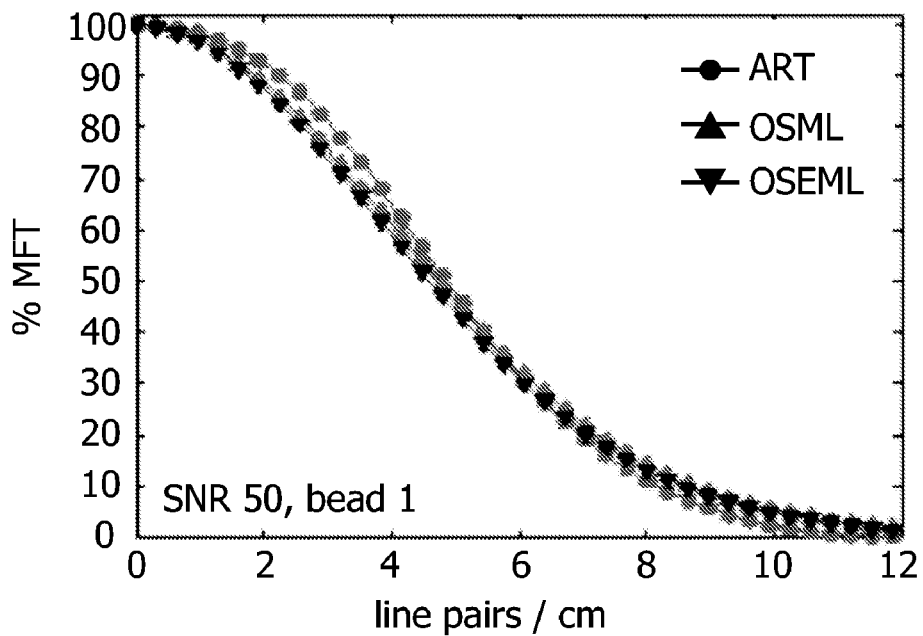
FIGS. 3a-3d depicts resolution measurements for three exemplary steel beads (diagrams a-c) and noise measurements (diagram d) for the image of FIG. 2 when an ART algorithm extended according to the present invention (EART) is compared to standard ART and OSML algorithms.
Figure 3B:
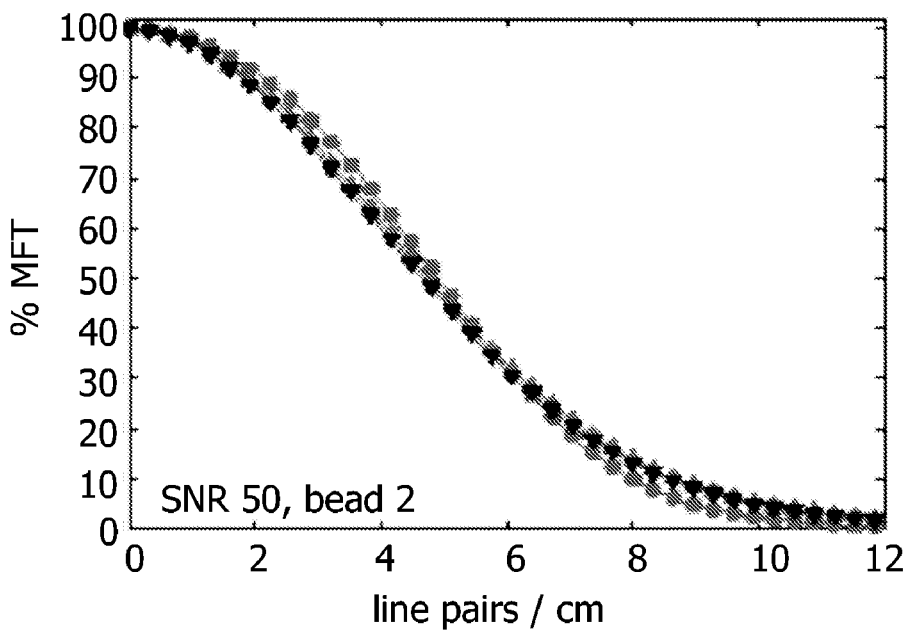
Figure 3C:
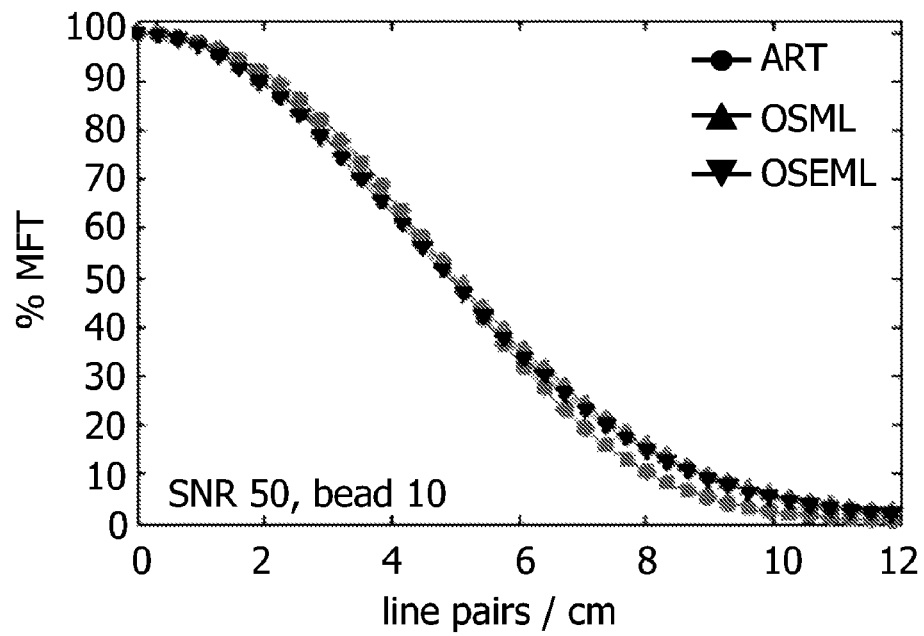
Figure 3D:
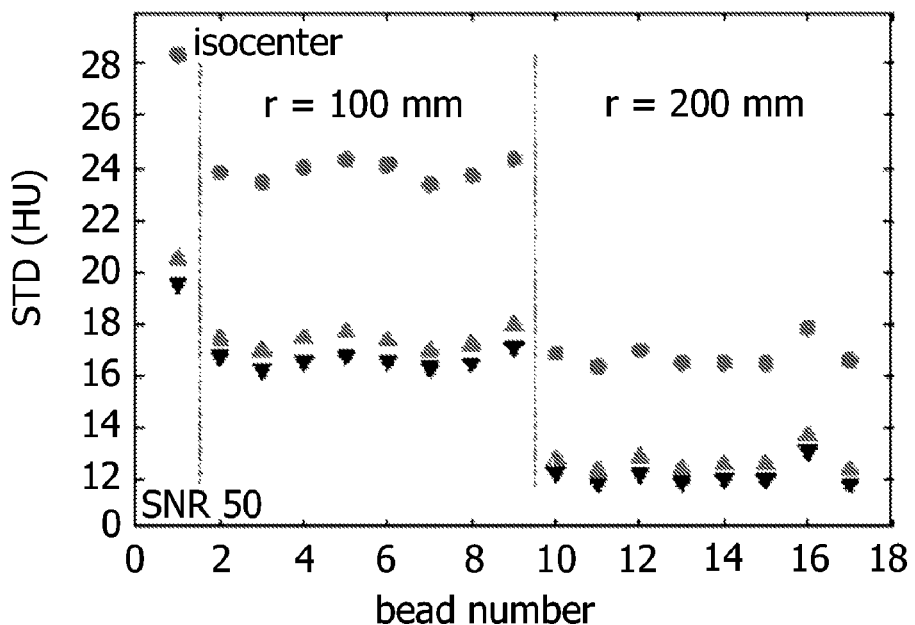
Figure 4A:
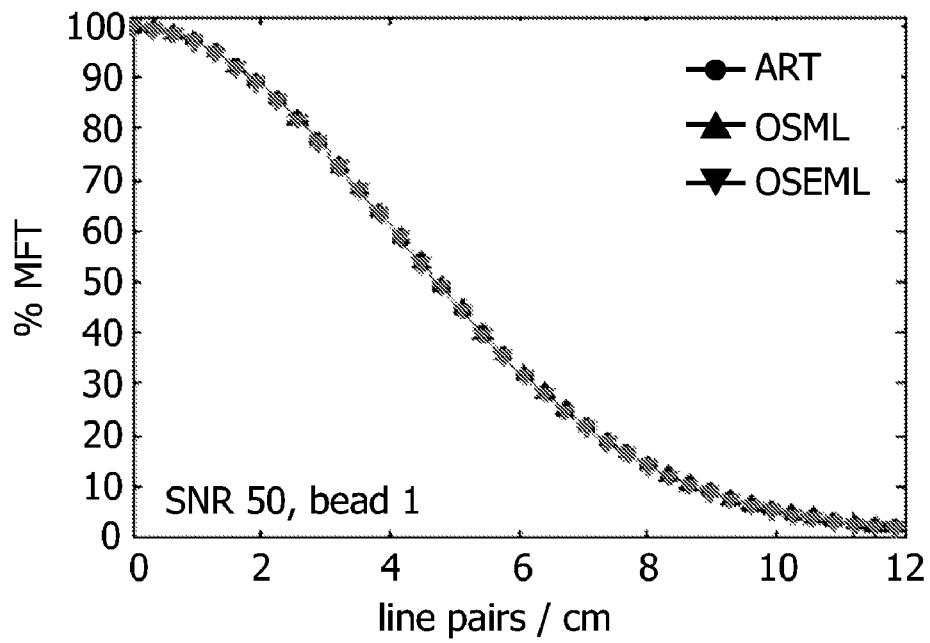
FIGS. 4a-4d depicts the same diagrams as FIG. 3 when an OSML algorithm extended according to the present invention (OSEML) is compared to a standard OSML algorithm.
Figure 4B:
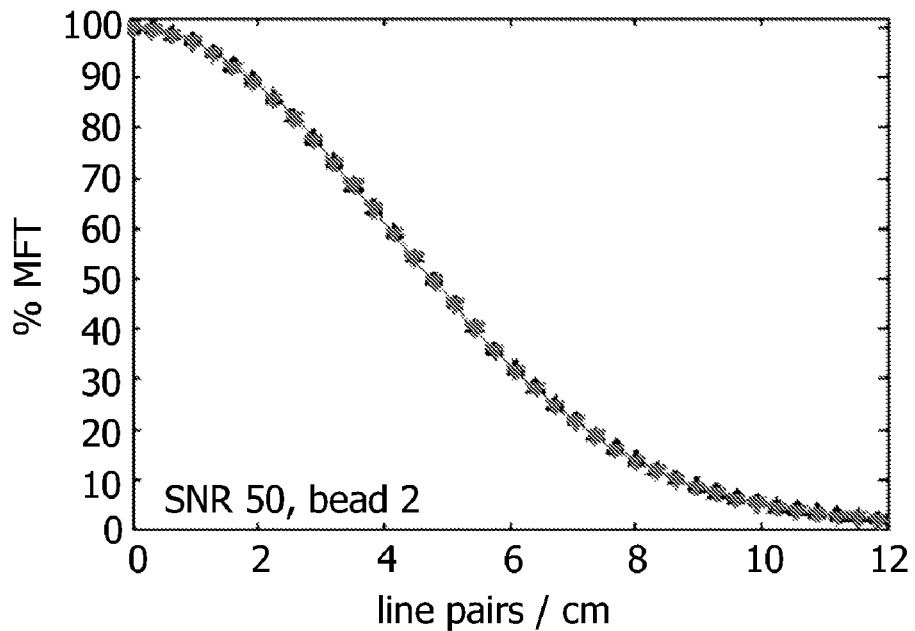
Figure 4C:
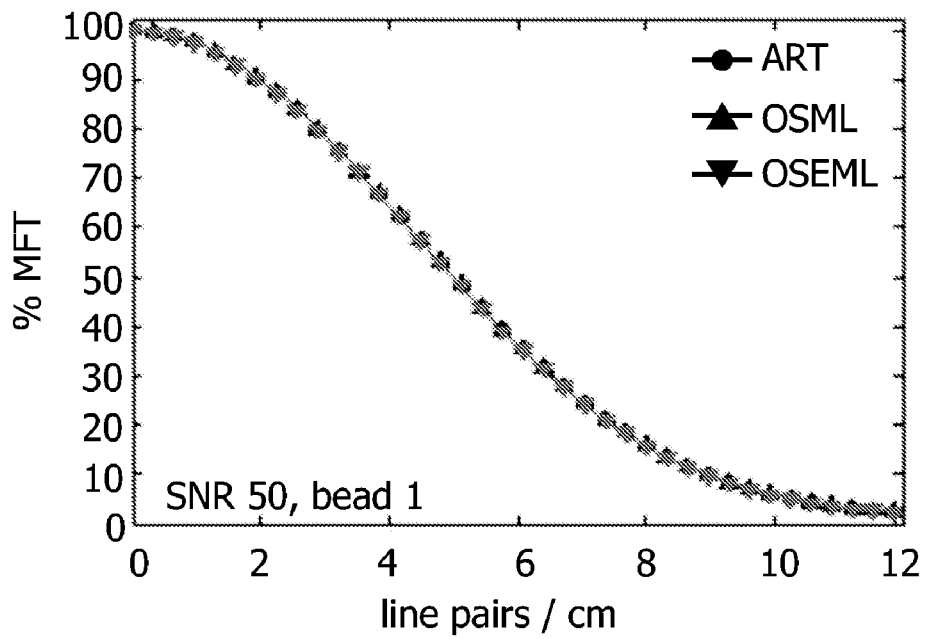
Figure 4D:
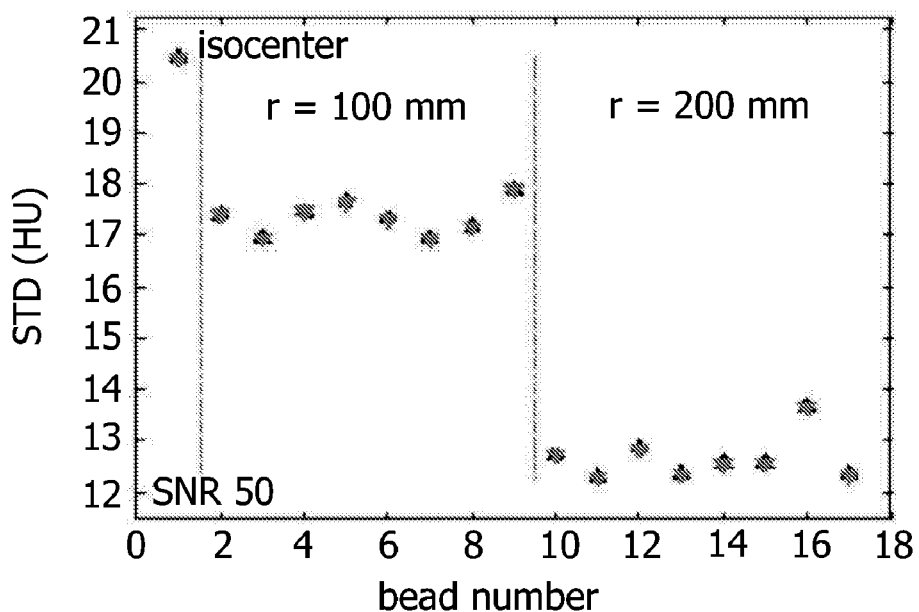

FIG. 2 shows the image of a water phantom (reconstructed with FBP using the projections with a SNR of 800) with a diameter of 500 mm and 17 beads that was used to simulate a transmission tomography scan with 1160 views for one turn. One bead is placed in the center of the phantom, 8 beads at a distance of 100 mm from the center and 8 beads at a distance of 200 mm from the center of the phantom. The beads have the i-value of steel. The center bead is called "bead 1", the 8 beads in the inner circle are called "bead 2" to "bead 9", and the 8 beads in the outer circle are called "bead 10" to "bead 17". The noise around each bead is calculated using the voxels between the boxes B1 and B2.

With this special resolution phantom, it can be shown that OSEML has the same resolution and noise as OSML (FIG. 4), and that EART has a lower noise at the same resolution as ART (FIG. 3). In FIGS. 3 and 4, the MTFs, which are measured, are presented for (a) the central bead, for (b) one bead located at 100 mm off-center, and for (c) one of the outermost beads. Also, diagram (d) represents the noise (STD) in the neighborhood of each bead in Hounsfield units, which is nearly equal for all beads at the same distance from the center of the phantom. In particular, FIG. 3 represents the results for EART, ART and OSML reconstruction, while FIG. 4 represents the results for OSEML and OSML reconstruction. In both cases, the projections through the water resolution phantom with a SNR of 50 were used. A similar improvement could be obtained using projections with a SNR of 800.

In summary, a method with a voxel-dependent update is proposed, where the update is distributed inhomogeneously along one forward projection. The resulting algorithm has the performance of OSML reconstruction. During the calculation of the forward projection, each voxel contributes to this calculation differently. The relative weight for each voxel is given by the voxel-contribution to the backprojections divided by the forward projection and used to weight the update for each voxel during the backprojection. The method can be used in CT and X-Ray reconstruction and in general in every iterative reconstruction algorithm, which has to calculate a forward projection.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:

1. A data processing unit for the iterative reconstruction of the attenuation coefficients $\mu_j$ (j =1 , . . . N) of a tomographic image from projection measurements $m_i$ (i=1, . . . P), wherein $$m_i = R(p_i) \text{ and} \tag{1}$$

$$p_i = [A\underline{\mu}]_i = \sum_v A_{iv}\mu_v \tag{2}$$

with a given measurement function R and a given weighting matrix $A = [A_{ij}]$, the data processing unit being adapted to determine the update $\mu_j^{n+1}$ (n =1, . . .) of the attenuation coefficient $\mu_j^n$ in the n-th iteration step according to the following equation:

$$\mu_j^{n+1} = \mu_j^n + \lambda \sum_{i \in I_n} V\left(\frac{A_{ij}\mu_j^n}{p_i^n}\right) \cdot W_i(A, p_i^n) \cdot A_{ij}\delta_i^n. \tag{3}$$

2. The data processing unit according to claim 1, wherein the measurement function R is the identity.

3. The data processing unit according to claim 1, wherein the index set $I_n$ contains only one element.

4. The data processing unit according to claim 1, wherein the weighting function $W_i$ is given by $$W_i(A, p_i^n) = \frac{1}{\sum_v A_{iv}^2}. \tag{4}$$

5. The data processing unit according to claim 1, wherein the measurement function R is defined as $$R(p_i) = \exp(-p_i). \tag{5}$$

6. The data processing unit according to claim 1, wherein the i-th projection measurement $m_i$ is determined from the numbers $d_i$ and $Y_i$ of photons before and after attenuation, respectively, according to $$m_i = \frac{Y_i}{d_i}. \tag{6}$$

7. The data processing unit according to claim 1, wherein the weighting function $W_i$ is given by $$W_i(A, p_i^n) = \exp(p_i^n) \tag{7}$$

8. Examination apparatus for the generation of tomographic images of an object, comprising an imaging device for the generation of projection measurements of the object, particularly an X-ray device, and a data processing unit according to claim 1.

9. A method for the iterative reconstruction of the attenuation coefficients $\mu_j$ (j=1, . . . N) of a tomographic image from projection measurements $m_i$ (i=1, . . . P) obeying equations (1) and (2), wherein the update $\mu_j^{n+1}$ (n+1, . . ) of the attenuation coefficient $\mu_j^n$ is determined according to equation (3).

10. A non-transitory record carrier on which a computer program for the iterative reconstruction of the attenuation coefficients $\mu_j$ (j =1, . . . N) of a tomographic image is stored, said program being adapted to execute a method according to claim 9.

* * * * *